L. M. JONES.
CUTTING MECHANISM.
APPLICATION FILED AUG. 4, 1914.

1,147,802.

Patented July 27, 1915.

WITNESSES
N. R. Tyndall
E. P. Hall

INVENTOR
L. M. Jones.
BY J. Edward Maybee
ATTY.

UNITED STATES PATENT OFFICE.

LYMAN MELVIN JONES, OF TORONTO, ONTARIO, CANADA, ASSIGNOR TO MASSEY-HARRIS COMPANY, LIMITED, OF TORONTO, CANADA.

CUTTING MECHANISM.

1,147,802. Specification of Letters Patent. Patented July 27, 1915.

Application filed August 4, 1914. Serial No. 855,003.

*To all whom it may concern:*

Be it known that I, LYMAN MELVIN JONES, of the city of Toronto, in the county of York, Province of Ontario, Canada, a subject of the King of Great Britain, have made certain new and useful Improvements in Cutting Mechanism, of which the following is a specification.

This invention relates to harvesters of the type in which the heads only of the grain are cut off leaving most of the straw in the stubble. Such harvesters use long toothed combs to catch the standing grain and guide the heads to a reciprocating knife at the base of the teeth which cuts them off.

My object is to devise improved means for connecting the comb to the cutter bar and for carrying the knife which will make the cutting mechanism more effective, more durable and render it more easy to repair in case of accidental damage.

I attain my object by means of the constructions hereinafter specifically described and illustrated in the accompanying drawings in which—

Figure 1:
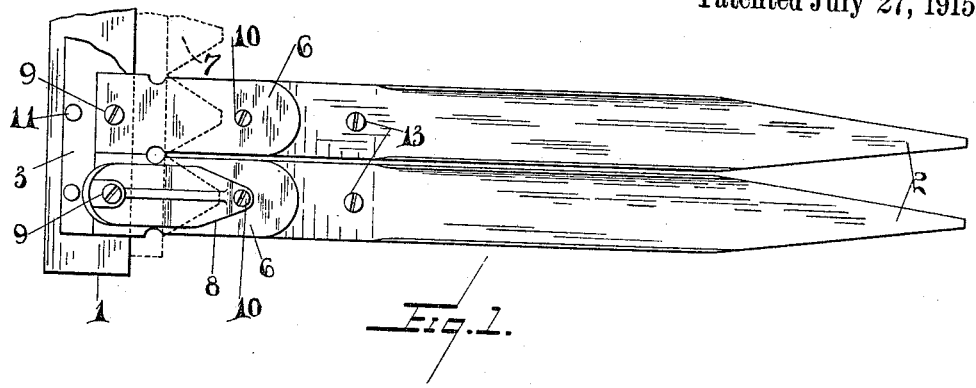
Figure 2:
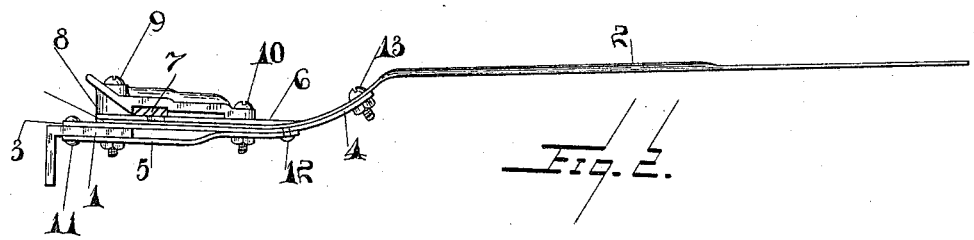

Figure 1 is a plan view of part of the cutting mechanism of a reaper thresher; Fig. 2 a side elevation of the same; and Fig. 3 a plan view of part of the cutting mechanism of a reaper thresher partly broken away looking at the underside.

In the drawings like numerals of reference indicate corresponding parts in the different figures.

Figure 3:
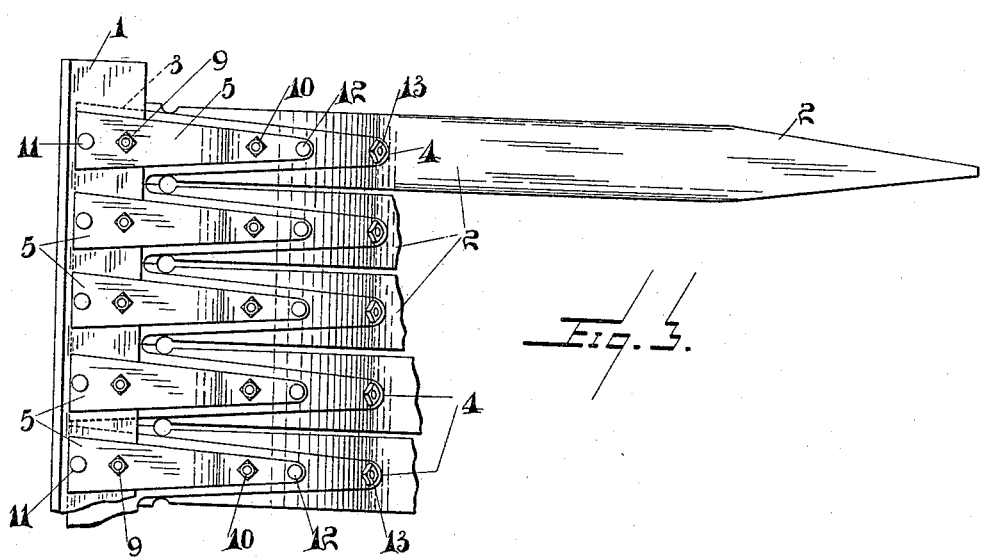

1 is the cutter bar preferably of angle steel. The comb is formed of a series of teeth 2 of the usual shape and fitted on top of the cutter bar. These teeth as usual are separated by spaces sufficiently wide for the passage of the stems of the grain. Between the teeth and the cutter bar I fit a series of reinforcing plates 3 formed of convenient length. These reinforcing plates are provided with tongues 4, extending forwardly under the teeth 2. As indicated in Fig. 3, each reinforcing plate is of substantially the same width as four teeth, this being a convenient length.

5 are a series of braces fitted to the under side of the cutter bar and reaching forward under the reinforcing plate to a point beneath the tongues 4. On top of each of the teeth 2 I secure a ledger plate 6. On top of these ledger plates runs the knife 7 which is of the usual toothed form. The knife is held in place and suitably guided by the wearing plates 8. While a plurality of these plates will be employed it is not essential to provide one for each tooth.

As the knife is usually formed with a thickened back the wearing plates are correspondingly shaped to correspond with the configuration of the knife as will be seen in Fig. 2. The parts are secured together by means of the bolts 9 which pass through the braces 5, cutter bar 1, reinforcing plate 3 and teeth 2, and where a wearing plate occurs, through the latter also. Forward of the cutter bar the parts are held together by means of the bolts 10 which pass through the braces 5, the teeth 2, reinforcing plate 3, and wherever a wearing plate occurs, through the latter also. Behind the ledger plates and teeth the reinforcing plate and the braces are secured to the cutter bar by means of the bolts or rivets 11. The forward ends of the braces are preferably also secured to the teeth by means of the rivets 12, and the forward ends of the tongues 4 to the teeth of the comb by means of the bolts 13.

The ledger plates in front of a line drawn through the pieces of the reëntrant angles of the teeth of the knife must be separated by spaces substantially equal to the space between the comb teeth themselves. Just behind this line an enlarged opening is preferably formed between the adjacent teeth and ledger plates to prevent any clogging of the teeth and ledger plates at this point with broken stems or heads.

The construction above described provides a very strong connection between the comb and the cutter bar, and at the same time it is very easy to renew any broken tooth simply by loosening a few bolts. The reinforcing means being made in a series of sections it is not necessary to replace a whole plate if any part becomes broken. By the use of the ledger plates and the wearing plates I reduce any wear to the knife to a minimum and at the same time make it possible to renew worn parts without throwing away the comb and the other parts as is the case with ordinary constructions.

It should be noted that the bottom of the wearing plates in front of as well as behind the knife is an important feature of the construction.

What I claim as my invention is:

1. The combination of a cutter bar; a series of comb teeth secured thereto; and a series of reinforcing plates secured to the cutter bar under the comb teeth, and provided with fingers extending forward beneath the comb teeth and secured thereto.

2. The combination of a cutter bar; a series of comb teeth secured on top thereof; a series of reinforcing plates secured on top of the cutter bar below the comb teeth and provided with tongues extending forward beneath the comb teeth; and a brace for each comb tooth each connected with the under side of the cutter bar and one of the tongues of the reinforcing plates.

3. The combination of a cutter bar; a series of comb teeth secured on top of said bar; a series of ledger plates secured on top of said teeth; a knife operating on top of said ledger plates; and a plurality of wearing plates each secured over a ledger plate and adapted to hold said knife in operative position on the ledger plates.

4. The combination of a cutter bar; a series of comb teeth fitted on top of said bar; a series of ledger plates fitted on top of said teeth; a knife operating on top of said ledger plates; a plurality of wearing plates each fitted over a ledger plate and adapted to hold said knife in operative position on the ledger plates; rear fastenings extending through the wearing plates, ledger plates, comb teeth and cutter bar; forward fastenings extending through the wearing plates ledger plates and comb teeth; and fastenings securing the ledger plates, comb teeth and cutter bar together where no wearing plates are employed.

5. The combination of a cutter bar; a series of comb teeth fitted on top of said bar; reinforcing plates fitted on top of the cutter bar beneath the comb teeth and provided with fingers extending forward beneath the comb teeth; a series of ledger plates fitted on top of said teeth; a knife operating on top of said ledger plates; a pluralty of wearing plates each fitted over a ledger plate and adapted to hold said knife in operative position on the ledger plates; rear fastenings extending through the wearing plates, ledger plates, comb teeth, reinforcing plates, and cutter bar; forward fastenings extending through the wearing plates, ledger plates, comb teeth reinforcing plate; and fastenings securing the ledger plates, comb teeth and cutter bar together where no wearing plates are employed.

6. The combination of a cutter bar; a series of comb teeth secured on top of said bar; a series of ledger plates secured on top of said teeth; a knife operating on top of said ledger plates, enlarged spaces being formed between the adjacent edges of the teeth and of the overlying ledger plates immediately behind the cutting edges of the knife; and a plurality of wearing plates each secured over a ledger plate and adapted to hold said knife in operative position on the ledger plates.

7. The combination of a cutter bar; a series of comb teeth secured on top of said bar; a series of ledger plates secured on top of said teeth; a knife operating on top of said ledger plates; a plurality of wearing plates each fitted over a ledger plate; and fastenings both in front of and behind the knife securing the wearing plates to the ledger plates and comb teeth.

This twenty second day of April A. D. 1914.

LYMAN MELVIN JONES.

In the presence of—
STANLEY BISHOP CHATLEY,
CHARLES N. MCLEOD.

Copies of this patent may be obtained for five cents each, by addressing the "Commissioner of Patents, Washington, D. C."